Jan. 7, 1930.  L. T. ROBINSON  1,742,970
OSCILLOGRAPH GALVANOMETER
Filed May 25, 1929    2 Sheets-Sheet 1
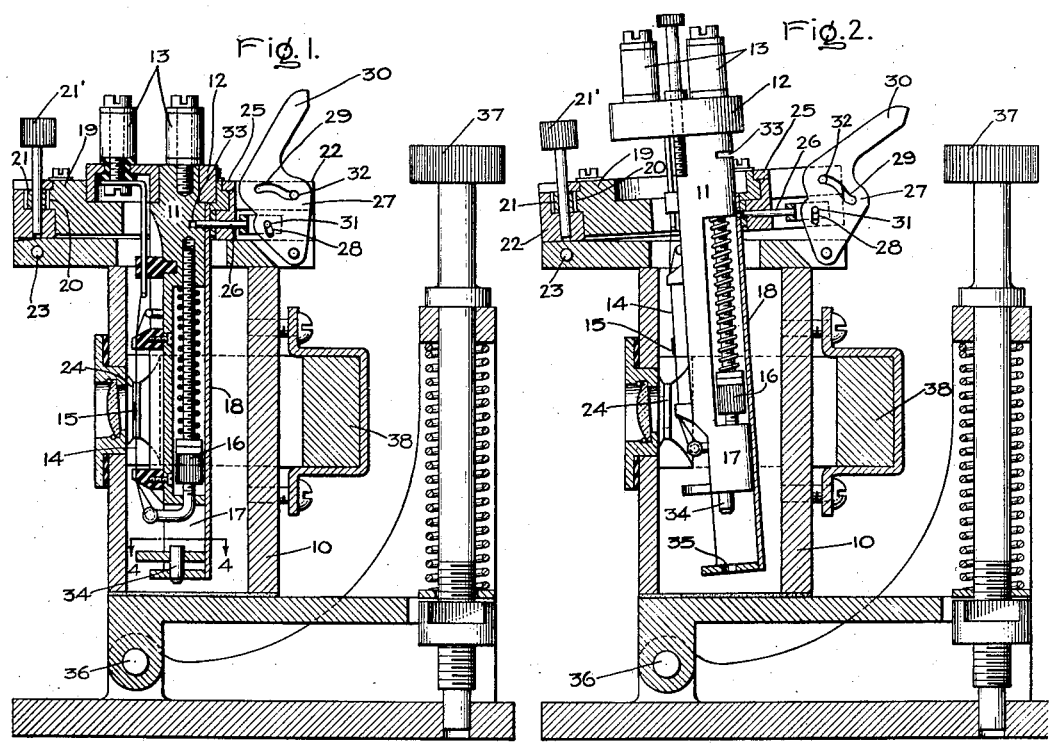
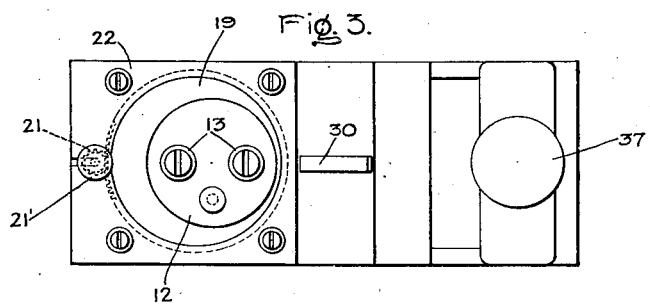
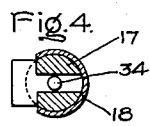
Inventor:
Lewis T. Robinson,
by Charles E. Tullar
His Attorney.

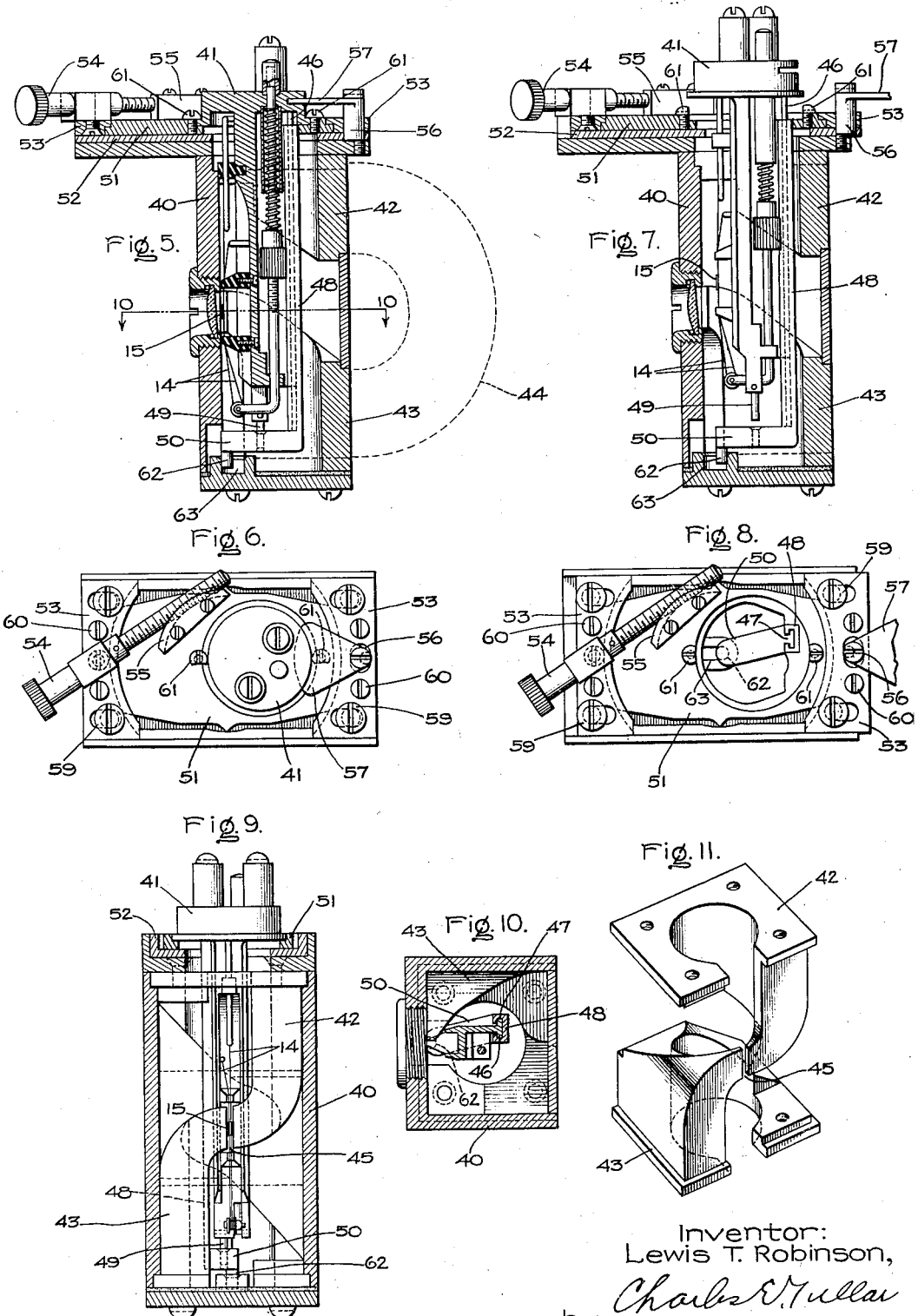

Patented Jan. 7, 1930

1,742,970

UNITED STATES PATENT OFFICE

LEWIS T. ROBINSON, OF SCHENECTADY, NEW YORK, ASSIGNOR TO GENERAL ELECTRIC COMPANY, A CORPORATION OF NEW YORK

OSCILLOGRAPH GALVANOMETER

Application filed May 25, 1929. Serial No. 366,070.

My invention relates to galvanometers such as those employed in oscillographs of the general character described in my United States Patent 919,467, April 27, 1909.

In this type of apparatus there are one or more compartments called cell boxes in which are mounted the stationary pole pieces and the movable mirror element of the galvanometer. The pole pieces are located very close together and shaped so as to produce an intense magnetic field across the intervening space. A tiny mirror usually mounted on two taut parallel conductors or a looped conductor is located in the intense magnetic field between the pole pieces. The current to be measured by the device is conveyed through the two parallel conductors in opposite directions and the fields produced around the conductors by the current flowing therein react against the intense field between the pole tips, causing the conductors to move in opposite directions and producing a rotational movement of the mirror. The parallel conductors are mounted upon a supporting structure including means for keeping the conductors taut and with suitable terminals exterior to the cell box. This supporting structure and the parts carried thereby is herein called the vibrator element and it is removable as a unit from the cell box. The cell box contains a heavy transparent damping liquid into which the moving parts of the vibrator element are immersed when in operative position and it is therefore desirable that the vibrator element be removable from the top of the cell box. The moving parts of this element are very delicate and the clearance between them and the stationary pole tips is very small. The inserting of the vibrator element into the cell box, its adjustment and its removal from the cell box without damage and without waste of the damping liquid has always been a troublesome problem. The position of the tiny mirror must also be capable of exact adjustment and rigidly held in operating position after adjustment.

It is the primary object of my invention to provide a cell box assembly with a removable vibrator element so constructed that the delicate parts thereof can not come into contact with the pole tips or other interior parts of the cell box when the vibrator element is inserted or removed.

A further object of my invention is to combine with the above assembly, means for adjustably locking the vibrating element in place and closing the cell box to keep out dust, etc. These objects are accomplished by my invention without loss or waste of the damping fluid contained within the cell box.

The features of my invention which are believed to be novel and patentable will be pointed out in the claims appended hereto.

In the drawings I have represented two forms in which the device may be constructed for accomplishing the objects of my invention. The preferred and simpler form is shown in Figs. 1 to 4 inclusive, Fig. 1 representing a sectional view of the cell box with the vibrator element, also represented in section, in its operating position; Fig. 2 a sectional view of the cell box with the vibrator element partially removed; Fig. 3 a top view of the cell box, and Fig. 4 a sectional view of the lower end of the vibrator element frame and support taken on line 4—4, Fig. 1.

The second modification of the invention is represented in Figs. 5 to 11 inclusive, Fig. 5 represents a sectional view of the cell box with the vibrator element, also represented in section, in its operating position; Fig. 6 is a top view of the cell box when closed and locked as in Fig. 5; Fig. 7 represents a sectional view of the cell box with the vibrator element partially removed; Fig. 8 shows a top view of the cell box with the vibrator element removed; Fig. 9 is a view of the cell box and vibrator element as it would appear from the front with the front wall removed and the cover parts adjacent the vibrator element head shown in cross section; Fig. 10 is a horizontal cross section of the cell box vibrator element and guide taken on line 10—10 of Fig. 5; and Fig. 11 is a perspective view of the magnetic pole piece assembly for this modification of the galvanometer.

The general construction and purpose of an oscillograph and the relation of its component parts are set forth in my United States Patent 919,467, April 27, 1909, I will therefore confine the present description to those portions of the cell box assembly necessary for an understanding of the present invention.

Referring to Figs. 1 to 4 inclusive, and in particular to Figs. 1 and 2, the cell box is represented in general by the reference character 10 and the removable vibrator element by the reference character 11. In Fig. 1 the vibrator element is shown partially in section and in its operating position, and in Fig. 2 it is shown partially removed from the cell box. For the purposes of the present invention the vibrator element may be considered as comprising the circular head portion 12 carrying the circuit terminals 13 and supporting the downward extending frame 17 for the parallel conductors 14, mirror 15 and the adjustable conductor tensioning means 16.

The exterior of the downwardly extending frame 17 of the vibrator element is shaped to fit into a tubular guide 18. The guide 18 is suitably cut away at the front to accommodate the movable element of the galvanometer. These telescoping parts need not necessarily be circular in cross section as represented in Fig. 4, but may be of any corresponding shape so as to provide vertical guiding surfaces from top to bottom to restrain the vibrator element from damaging horizontal movement while being inserted or withdrawn from the cell box.

The tubular guide 18 into which the vibrator element slides is rigidly fastened at its top to a circular support 19. The upper surface of 19 is recessed to accommodate the head portion 12 of the vibrator element. The support 19 has a gear 20 cut in a portion of its periphery which meshes with a pinion 21 rotatably mounted in a plate 22. Rotation of pinion 21 by the thumb piece 21' rotates the support 19 and the parts carried thereby to enable the mirror 15 to be correctly adjusted between the stationary pole pieces, one of which is shown at 24. Support 19 is held in place in plate 22 in any suitable manner, as by a ring 25. The plate 22 is hinged at 23 to the top forward surface of the cell box structure so that the plate 22, the support 19, the tubular guide 18 and the vibrator element 11 may be tilted as a unit from the position shown in Fig. 1 to that shown in Fig. 2.

It will be noted that this tilting action moves the conductor 14 and mirror 15 back from the operating position between the pole pieces 24 into a position where the vibrator element may be withdrawn from the cell box without causing the delicate parts 14 and 15 to come into contact with any interior portion of the cell box structure. Fig. 1 thus represents what may be termed the operating position of the parts and Fig. 2 the safe withdrawal position.

I provide locking means whereby the vibrator element can not be removed or inserted until the guide 18 has been tilted to the safe withdrawal position shown in Fig. 2. This locking device comprises a slidable pin 26 combined with a cam lever 27 for tilting the plate 22 so that the unlocking and tilting actions must be performed simultaneously. The cam 27 is hinged at 28 to the top rear surface of the cell box structure. It is provided with slots 28 and 29 and a handle 30. A pin 31 secured in fixed relation to the locking pin 26 is contained in slot 28 and a pin 32 contained in a vertical slit in the right hand end of the plate 22 engages with slot 29. The slots 28 and 29 are so shaped that as the cam is turned from the position shown in Fig. 1 to that shown in Fig. 2 locking pin 26 is moved to the right and plate 22 is tilted upward. When the cam 27 is in the locked position (Fig. 1) locking pin 26 extends into the tubular guide 18. If the vibrator element is in place the pin 26 fits into a horizontal slit 33 in the vibrator element frame and hence the latter can not be withdrawn until unlocked. If the vibrator element is removed the pin 26 prevents its insertion until the parts are moved to the unlocked position (Fig. 2). This cam arrangement also tightly closes the top of the cell box when in the locked position, the parts 22, 19 and 12 serving as a hinged cover.

A pin 34 at the bottom of the vibrator element frame is preferably provided to fit into a corresponding opening 35 at the bottom of the tubular guide 18. Thus, when the vibrator element is inserted the pin 34 serves to exactly position the vibrator element in the center of the tubular guide. This makes it unnecessary to have the tubular fit so tight as to render difficult the removal of the vibrator element.

The mirror 15 is on the axis of rotation of support 19 so that rotation of thumb piece 21' adjusts mirror 15 about its vertical axis between the pole pieces. The entire cell box structure is pivoted at 36 and may be adjusted about this pivot by means of the thumbscrew arrangement shown at 37 for the purpose of directing the mirror ray at the desired vertical angle. A permanent magnet is shown at 38 partially surrounding the cell box for supplying the magnetic field of the galvanometer, but other arrangements may be used for this purpose.

In Figs. 5 to 11 inclusive I have represented another form in which my invention may be adapted to the oscillograph galvanometer. In this form the vibrator element instead of being tilted before removal is moved straight back from the front of the cell box. In these figures I have represented the cell box by reference character 40 and the vibrator element by 41. In this modification it will be noted that the interior wall of the cell box is in part formed by the magnetic structure made integral with the pole pieces, such portion being represented alone, in perspective in Fig. 11 at 42 and 43. A suitable magnet 44, represented in dotted lines in Fig. 5, is used to supply the magnetic field. Suitably shaped brass plates complete the enclosure and provide an oil-tight cell box. The nature of the air gap between the pole pieces into which the mirror and conductors are inserted is shown in Figs. 9 and 11 at 45. The conductors 14 and mirror 15 are as represented in the modification first described.

The removable vibrator element 41 is shown in its operative position in Fig. 5 and partially removed in Fig. 7. The vibrator element frame and top is made integral and the downwardly extending frame has a T-shaped rear edge 46 fitting into a correspondingly shaped guide 47 in a horizontally movable guide 48. The lower end of the vibrator element has a pin extension 49 adapted to enter a corresponding opening in the lower forwardly extending portion 50 of the guide to more exactly position the element when in operating position. The guide 48 is fastened integral with a top plate 51 which is rotatably mounted about an axis passing through the mirror on a second top plate 52. Plate 51 is held on plate 52 by the pieces 53, the latter having inner curved beveled edges overlapping a corresponding beveled surface on the extremities of plate 51. A thumbscrew 54 secured in fixed relation with plate 52 and cooperating with a gear sector 55 secured on plate 51 serves to rotate plate 51, guide 48 and the vibrator element 41 as a unit when the rotative position of the mirror requires adjustment.

Plate 52 together with the plate 51 is arranged to slide horizontally from front to rear on the upper structure of the cell box and this movement is accomplished by a cam 56 inserted through slots in piece 53 and plate 52 and threaded into the stationary top of the cell box structure. Cam 56 may be rotated by the use of a screwdriver, its top surface being slotted for that purpose. On the upper portion of cam 56 is a fan-shaped extension 57, of suitable dimensions, which in the position shown in Figs. 5 and 6 with the vibrator element in operating position, enters a horizontal slit cut in the head of the vibrating element and locks the element in place so that it can not be removed. If the vibrating element is removed with the part 57 turned as in Figs. 5 and 6 it extends sufficiently far to the left to cover the slot 47 in the guide 48 thereby preventing the vibrating element from being inserted until the part 57 is turned to the rear, as in Figs. 7 and 8. Thus when cam 56 is turned from the locked position of Fig. 5 to the unlocked position of Fig. 7, the parts which carry the vibrator element and its guide are moved from the operating position to the rear, bringing the mirror 15 and conductors 14 back far enough so that the vibrator element may be withdrawn without damage to these delicate parts. Thus, Fig. 5 represents the locked, operating position and Fig. 7 the unlocked, safe withdrawal position of the apparatus.

Screws 59 extend through slots in the parts 53 and 52 into the top of the cell box structure to retain the parts in their operative relation and secure a tight closure of the cell box. The longer edges of plate 52 and the top plate of the cell box are preferably provided with upstanding flanges to secure a good mechanical structure. Screws 60 extend only into plate 52 and hold parts 53 in place on plate 52. Screws 61 may be used to more securely hold the vibrator element in place. The screw heads fit over a flange on the head of the vibrator element and have one side cut off so that a portion of a turn is sufficient to release the vibrator element. The lower end of the guide is preferably provided with a pin 62 fitting in a slot 63 in the base plate of the cell box to steady and support the lower end of the guide against undesired movements.

From the foregoing description it will be seen that I have provided for the safe removal and insertion of the vibrator element relative to the cell box by the provision of suitable cooperating locks and guides between the cell box and vibrator element frame. These safety devices are so designed as not to interfere with the necessary adjustment features of the device. A tight closure of the cell box is provided when in operating condition. The removal and adjustment of the vibrator element is accomplished from the top of the oil-tight cell box, making it unnecessary to empty out the damping liquid.

Having thus described the purpose and structural features of two embodiments of the invention I aim to include in the appended claims such other modifications as come fairly within the true spirit and scope of my invention.

What I claim as new and desire to secure by Letters Patent of the United States, is:

1. An oscillograph galvanometer comprising a cell box, spaced pole pieces in said cell box, a vibrator element supporting the movable element of said galvanometer and removable as a unit from said cell box, said vibrator element having an operating position with the movable element of the galvanometer between said pole pieces and a safe withdrawal position where the movable element of the galvanometer is withdrawn from between the pole pieces, a guiding support for said vibrator element which is movable with respect to the said cell box to move the vibrator element from the operating position to the safe withdrawal position and vice versa, means for so moving said support, and means for locking the vibrator element against withdrawal except when the parts are in the safe withdrawal position.

2. An oscillograph galvanometer comprising a cell box, spaced pole pieces in said cell box, a vibrator element carrying the movable element of said galvanometer removable from said cell box, a support for said vibrator element mounted on one of the exterior surfaces of said cell box, cooperating guiding surfaces on said support and vibrator element whereby the vibrator is restrained from damaging movements while being inserted or withdrawn from the cell box, means for moving said support to move the vibrator element from a safe withdrawal position into operating position after being inserted in the cell box, and locking means preventing the withdrawal of said vibrator until it has been moved from the operating to the safe withdrawal position.

3. An oscillograph galvanometer comprising a cell box having spaced pole pieces therein, a vibrator element removable as a unit from the cell box and including the movable element for the galvanometer having a mirror mounted to oscillate about a given axis, a support for the vibrator element mounted on an exterior surface of the cell box and having guiding surfaces extending into the cell box, corresponding guiding surfaces on the vibrator element, said surfaces fitting together in telescoping relation from end to end whereby the vibrator element is prevented from damaging movements while being inserted or withdrawn from the cell box, and means requiring the withdrawal of the movable element of the galvanometer from an operating position between the pole pieces before said vibrator element can be withdrawn from the cell box.

4. An oscillograph galvanometer comprising a cell box, spaced pole pieces in said cell box, a vibrator element supporting movable conductors between said pole pieces, a mirror on said conductors between said pole pieces, a support for the vibrator element on an exterior surface of the cell box adapted to be moved in a fixed path to remove the conductors from the proximity of said pole pieces, vertical guides on said support and vibrator element whereby the latter may be withdrawn from the cell box, and means for locking the vibrator element against withdrawal until the conductors have been removed from the proximity of said pole pieces.

5. An oscillograph galvanometer comprising a cell box, a vibrator element supporting the movable part of said galvanometer and removable as a unit from the top of said cell box, a guiding support for said vibrator element movable on said cell box, said vibrator element and support having an operating position where the movable part of the galvanometer is between the pole pieces and a safe withdrawal position where the movable part of the galvanometer is withdrawn from between the pole pieces, a lock for preventing the removal of said vibrator element from the cell box except when the parts are in the safe withdrawal positions, said lock also serving to prevent the insertion of the vibrator element into said cell box except when the guiding support is in the safe withdrawal position.

6. An oscillograph galvanometer comprising a cell box, spaced pole pieces in said cell box, a vibrator element supporting the movable element of said galvanometer and removable as a unit from the top of said cell box, said vibrator element having an operating position with the movable element of said galvanometer between the pole pieces and a safe withdrawal position with the movable element of the galvanometer withdrawn from between said pole pieces, a guiding support for said vibrator element movable on the top of said cell box to move the vibrator element from operating to safe withdrawal position and vice versa, a lock for preventing the removal of said vibrator element from the cell box except when in the safe withdrawal position, and common means for moving said support and operating said lock.

7. An oscillograph galvanometer comprising a cell box, spaced pole pieces in said cell box, a vibrator element carrying a mirror between said pole pieces when in operating position and vertically removable as a unit from the top of the cell box after the mirror has been moved from between the pole pieces, a support for the vibrator element, said support comprising a cover portion for the cell box and a tubular guide extending downward into the cell box in which the vibrator element may be inserted in telescoping relation, a plate at the top of the cell box in which said cover portion is rotatably mounted about a vertical axis, said plate being hinged to the top portion of the cell box on a horizontal axis and movable about said axis to swing the galvanometer mirror from its operating position between the pole pieces substantially horizontally to a safe vertical withdrawal position, and locking means for preventing the withdrawal or insertion of the vibrator element relative to the cell box except when the parts are in the safe vertical withdrawal position.

8. An oscillograph galvanometer comprising a cell box containing spaced pole pieces adjacent the front interior wall thereof, a plate hinged about a horizontal axis at the top forward portion of the cell box and extending to the rear top portion of the cell box, a support for a vibrator element rotatably mounted in said plate about a vertical axis and having an open front tubular portion extending downward into the cell box to the rear of said pole pieces, a vibrator element fitting into the tubular portion of said support in telescoping relation and removable from the top of the cell box, the hinged plate and the upper portions of the support and vibrator element carried thereby comprising a hinged cover for the cell box, a cam lever at the rear of said hinged cover for opening it a limited amount sufficient to swing the downwardly extending portion of the vibrator element from its operating position to a safe withdrawal position, and locking means operated by said lever for preventing the insertion or withdrawal of said vibrator element except when the parts are in the safe withdrawal position.

9. An oscillograph galvanometer comprising a cell box, stationary spaced pole pieces in said cell box, a vibrator element removable as a unit from said cell box and carrying a mirror which is positioned between the pole pieces thereof when the vibrator element is in its operating position therein, and means for guiding said vibrator element along a predetermined path when removed from its operating position and from the cell box such that the mirror thereof is prevented from coming in contact with any portion of the pole pieces or cell box structure.

10. An oscillograph galvanometer comprising a cell box, a vibrator element supporting the movable part of said galvanometer and removable as a unit from said cell box, said vibrator element having an operating position where the movable part of the galvanometer is between the pole pieces and a safe withdrawal position where the movable part of the galvanometer is withdrawn from between the pole pieces, and cooperating guiding members on said vibrator element and cell box structure for guiding the movements of the vibrator element when moved from its operating position out of the cell box.

In witness whereof, I have hereunto set my hand this 23rd day of May, 1929.

LEWIS T. ROBINSON.